United States Patent
Kittaka

(10) Patent No.: US 12,025,192 B2
(45) Date of Patent: Jul. 2, 2024

(54) MOBILE BODY AND MOBILE BODY CONTROL METHOD

(71) Applicant: HONDA MOTOR CO., LTD., Tokyo (JP)

(72) Inventor: Eiji Kittaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/182,615

(22) Filed: Mar. 13, 2023

(65) Prior Publication Data

US 2023/0313852 A1 Oct. 5, 2023

(30) Foreign Application Priority Data

Mar. 29, 2022 (JP) ................... 2022-054682

(51) Int. Cl.
F16D 48/06 (2006.01)

(52) U.S. Cl.
CPC ...... F16D 48/06 (2013.01); *F16D 2500/1117* (2013.01); *F16D 2500/30406* (2013.01); *F16D 2500/3109* (2013.01); *F16D 2500/3127* (2013.01)

(58) Field of Classification Search
CPC ............. F16D 48/06; F16D 2500/1117; F16D 2500/30406; F16D 2500/3109; F16D 2500/3127
See application file for complete search history.

(56) References Cited

U.S. PATENT DOCUMENTS

| 2007/0276557 A1* | 11/2007 | Motosugi .............. B60W 10/06 701/67 |
| 2011/0190990 A1 | 8/2011 | Nedachi et al. |

FOREIGN PATENT DOCUMENTS

| DE | 103 08 713 A1 | 10/2003 |
| JP | H06-293230 A | 10/1994 |
| JP | H10-122269 A | 5/1998 |
| JP | 3965776 B2 * | 8/2007 |
| JP | 2007331534 A * | 12/2007 |
| JP | 4151139 B2 * | 9/2008 |
| JP | 2011-158062 A | 8/2011 |
| WO | 2015/159750 A1 | 10/2015 |

OTHER PUBLICATIONS

German Office Action dated Sep. 8, 2023, Application No. 10 2023 107 431.8; English translation included, 9 pages.
Japanese Office Action dated Dec. 12, 2023, Japanese Application No. 2022-054682.A, English translation included, 7 pages.

* cited by examiner

*Primary Examiner* — Justin Holmes
(74) *Attorney, Agent, or Firm* — Rankin, Hill & Clark LLP

(57) ABSTRACT

The mobile body includes: a stepped transmission; a clutch; a control device; a drive source; an output detection means that acquires an output of the drive source; and an acceleration detection means that acquires acceleration; in which the control device includes: a travel resistance calculation means that calculates a travel resistance based on the acceleration; and a clutch capacity setting means that performs clutch capacity setting based on the output and the travel resistance.

6 Claims, 10 Drawing Sheets

MOBILE BODY AND MOBILE BODY CONTROL METHOD

INCORPORATION BY REFERENCE

The present application claims priority under 35 U.S.C. § 119 to Japanese Patent Application No. 2022-054682 filed on Mar. 29, 2022. The content of the application is incorporated herein by reference in its entirety.

BACKGROUND

Technical Field

The present invention relates to a mobile body and a mobile body control method.

Related Art

A vehicle such as a motorcycle is greatly attractive in that an occupant can directly transmit his/her intention to the vehicle, and the occupant can drive the vehicle as if the vehicle were a part of the body. Examples of the operation target include throttle opening/closing adjustment by an accelerator, braking, stepped shifting accompanied by a clutch operation, and the like, which enable free traveling by an occupant.

It is disclosed that, in an automatic control clutch operated by hydraulic pressure supply, when shift control is automatically performed using an actuator, a clutch capacity is set based on an engine torque estimation value and corrected by various parameters (see JP 2011-158062 A).

SUMMARY

However, since the correction using these parameters is determined in advance under test conditions in a predetermined traveling state and the factor of safety is set to be high so that the clutch capacity can be sufficiently secured, the clutch capacity larger than the clutch capacity required in the actual traveling state is generated, and the oil pump process for generating the hydraulic pressure becomes large, which may cause a decrease in fuel consumption and acceleration. In addition, in the gradient path, depending on the setting of the clutch capacity, the shift shock at the time of shifting becomes large, and there is a possibility that the shift feeling is deteriorated.

The present invention provides a mobile body that performs clutch capacity control capable of accurately setting a clutch capacity based on an actual traveling state, and a mobile body control method.

An aspect of the present invention is a mobile body including: a stepped transmission; a clutch; a control device; a drive source; an output detection means that acquires an output of the drive source; and an acceleration detection means that acquires acceleration; in which the control device includes: a travel resistance calculation means that calculates a travel resistance based on the acceleration; and a clutch capacity setting means that performs clutch capacity setting based on the output and the travel resistance.

Further, another aspect of the present invention is a mobile body control method including: an output acquisition step of acquiring an output of a drive source; an acceleration acquisition step of acquiring acceleration; a travel resistance calculation step of calculating a travel resistance based on the acceleration; and a clutch capacity setting step of setting a clutch capacity based on the output and the travel resistance.

According to the aspects of the present invention, it is possible to provide the mobile body that performs clutch capacity control capable of accurately setting the clutch capacity based on the actual traveling state, and the mobile body control method.

DETAILED DESCRIPTION

Embodiment

Figure 1:
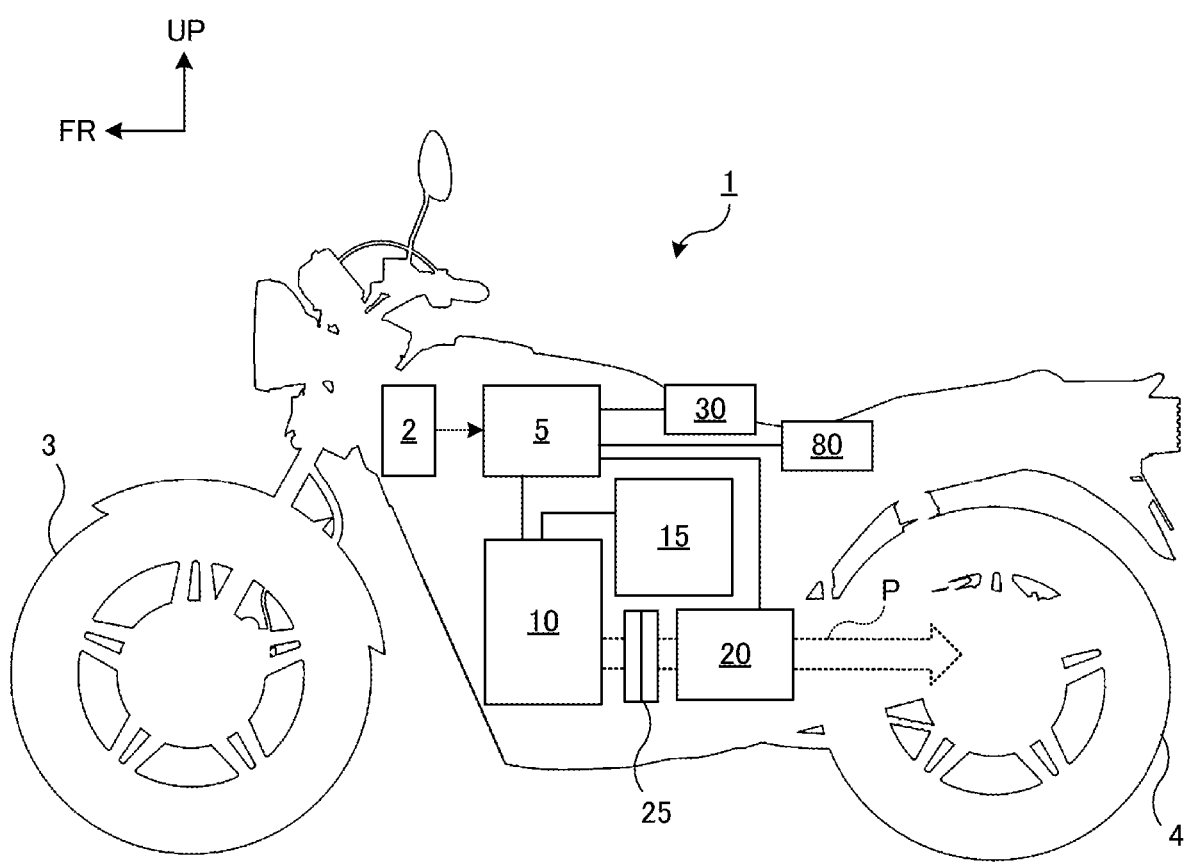
FIG. 1 is a diagram illustrating a configuration of a mobile body.

Hereinafter, an embodiment of the present invention will be described with reference to the drawings. Further, directions such as front, rear, left, and right in the following description are the same as those in a vehicle to be described below, unless specifically otherwise specified. In addition, an arrow FR indicating the front side of a vehicle and an arrow UP indicating the top side of the vehicle are illustrated at appropriate positions in the drawings used for the following description.

FIG. 1 is a view illustrating a left side surface of a mobile body 1. The mobile body 1 in the present embodiment is a saddle-ride vehicle. The mobile body 1 may be an electric motorcycle including a motor as a drive source 10 instead of an internal combustion engine such as a gasoline engine. The mobile body 1 includes an accelerator grip, a clutch lever, a shift pedal, and the like as an operation system 2 for an occupant to control the mobile body 1. The mobile body 1 includes a front wheel 3 which is a steering wheel, and a rear wheel 4 which is a driving wheel. The rear wheel 4 is supported by a rear portion of a swing arm (not illustrated) swingably supported by a vehicle body frame (not illustrated).

Note that the mobile body 1 is not limited to the saddle-ride vehicle as illustrated in FIG. 1, and may be a four-wheel automobile or a three-wheel vehicle.

The mobile body 1 includes a control device 5 for performing various controls. The control device 5 may be an electronic control unit (ECU). The mobile body 1 includes a drive source 10 that generates a driving force and an energy supply source 15 that supplies energy for traveling. The mobile body 1 includes a clutch 25 and a stepped transmission 20 in order to transmit a driving force P of the drive source 10 to rear wheels 4. The drive source 10 and the stepped transmission 20 are controlled by the control device 5 that performs control according to an instruction to the operation system 2 by the occupant.

Specifically, the control device 5 is a computer including a processor such as a central processing unit (CPU), a read only memory (ROM) in which a program is written, a random access memory (RAM) for temporarily storing data, and the like. Various control functions are executed by the control device 5 as a computer executing the program. Instead of or in addition to the control device 5, all or a part of the control device 5 may be configured by hardware including one or more electronic circuit components.

The drive source 10 is an internal combustion engine, that is, an engine. When the mobile body 1 is an electric motorcycle, the mobile body 1 may be a three-phase electric motor or the like. The energy supply source 15 is a fuel tank. When the mobile body 1 is an electric motorcycle, the mobile body 1 may be a lithium ion battery or the like. The drive source 10 and the energy supply source 15 are fixed to the vehicle body frame. The stepped transmission 20 is a power transmission mechanism that changes the rotational speed by combining a plurality of gears. The clutch 25 is a device that is attached between the drive source 10 and the stepped transmission 20 and transmits or cuts off the driving force P to the stepped transmission 20. The occupant operates the clutch 25 by operating a clutch lever (not illustrated). The stepped transmission 20 and the clutch 25 in the present embodiment are dual clutch transmissions (DCTs) that perform hydraulic clutch control independently for odd-numbered gear trains and even-numbered gear trains, but may be normal manual transmissions.

Figure 2:
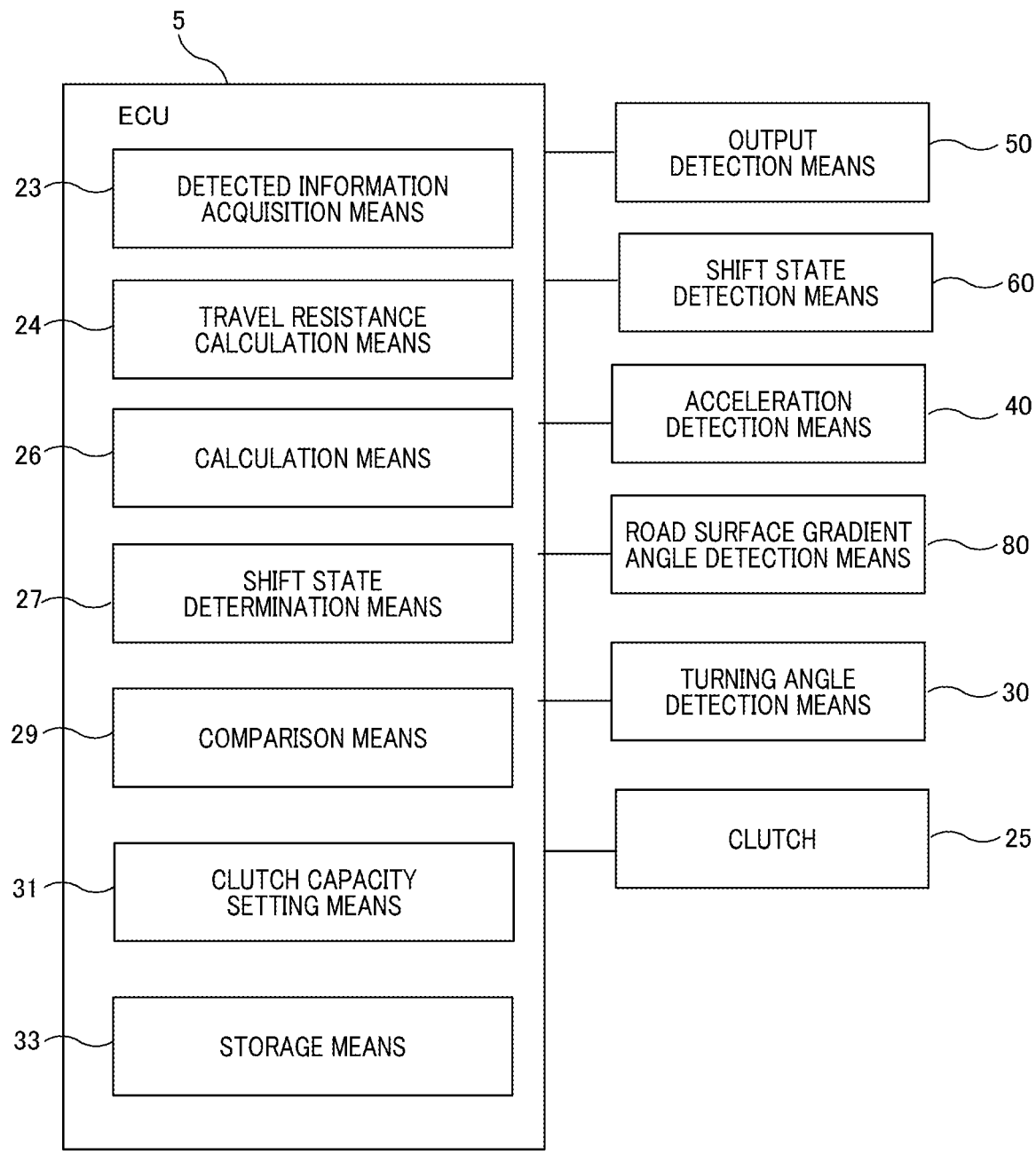
FIG. 2 is a diagram illustrating a configuration for implementing mobile body control according to the present embodiment.

FIG. 2 is a diagram illustrating a configuration for implementing mobile body control according to the present embodiment. The control device 5 is connected to an output detection means 50 that is a sensor and detects an output value of the drive source 10. The control device 5 is connected to a shift state detection means 60 that is a sensor and detects shift state information in the stepped transmission 20 included in the mobile body 1. The control device 5 is connected to an acceleration detection means 40. The acceleration detection means 40 may be an inertial measurement unit (IMU) that is a sensor and detects behavior information of the mobile body 1. The IMU detects behavior information of the mobile body 1 including a roll angle, a roll angular velocity (roll rate), a yaw angle, a yaw angular velocity (yaw rate), a pitch angle, a pitch angular velocity (pitch rate), acceleration, angular acceleration, and the like of the mobile body 1. In other words, the IMU detects translational movement and rotational movement for a plurality of directions orthogonal to each other.

In addition, the control device 5 is connected to a road surface gradient angle detection means 80 that is a sensor and detects a road surface gradient angle. The control device 5 is connected to the clutch 25. The control device 5 is connected to a turning angle detection means 30 that is a sensor and detects a turning angle of the mobile body 1.

The control device 5 includes a detected information acquisition means 23 that acquires information detected by the acceleration detection means 40 and various detection means. The control device 5 includes a travel resistance calculation means 24 that calculates a travel resistance based on the acquired information. The control device 5 includes a shift state determination means 27 that determines a shift state of the stepped transmission 20. The control device 5 includes a comparison means that compares the output value of the drive source 10 with the magnitude of the travel resistance. The control device 5 includes a clutch capacity setting means that calculates and sets the clutch capacity of the clutch 25.

In addition, the control device 5 includes a storage means 33 that stores programs and data for implementing various means, and a designated area, a shift-up threshold, and a shift-down threshold to be described later. The storage means 33 is implemented by a storage device such as a solid state drive (SSD) and includes a memory.

The detected information acquisition means 23 is implemented by an interface circuit or the like. The travel resistance calculation means 24, the calculation means 26, the shift state determination means 27, the comparison means 29, and the clutch capacity setting means are implemented by the control device 5 executing the program stored in the storage means 33.

The road surface gradient angle detection means 80 and the turning angle detection means 30 may be included in the acceleration detection means 40 when the acceleration detection means 40 is an IMU.

Figure 3:
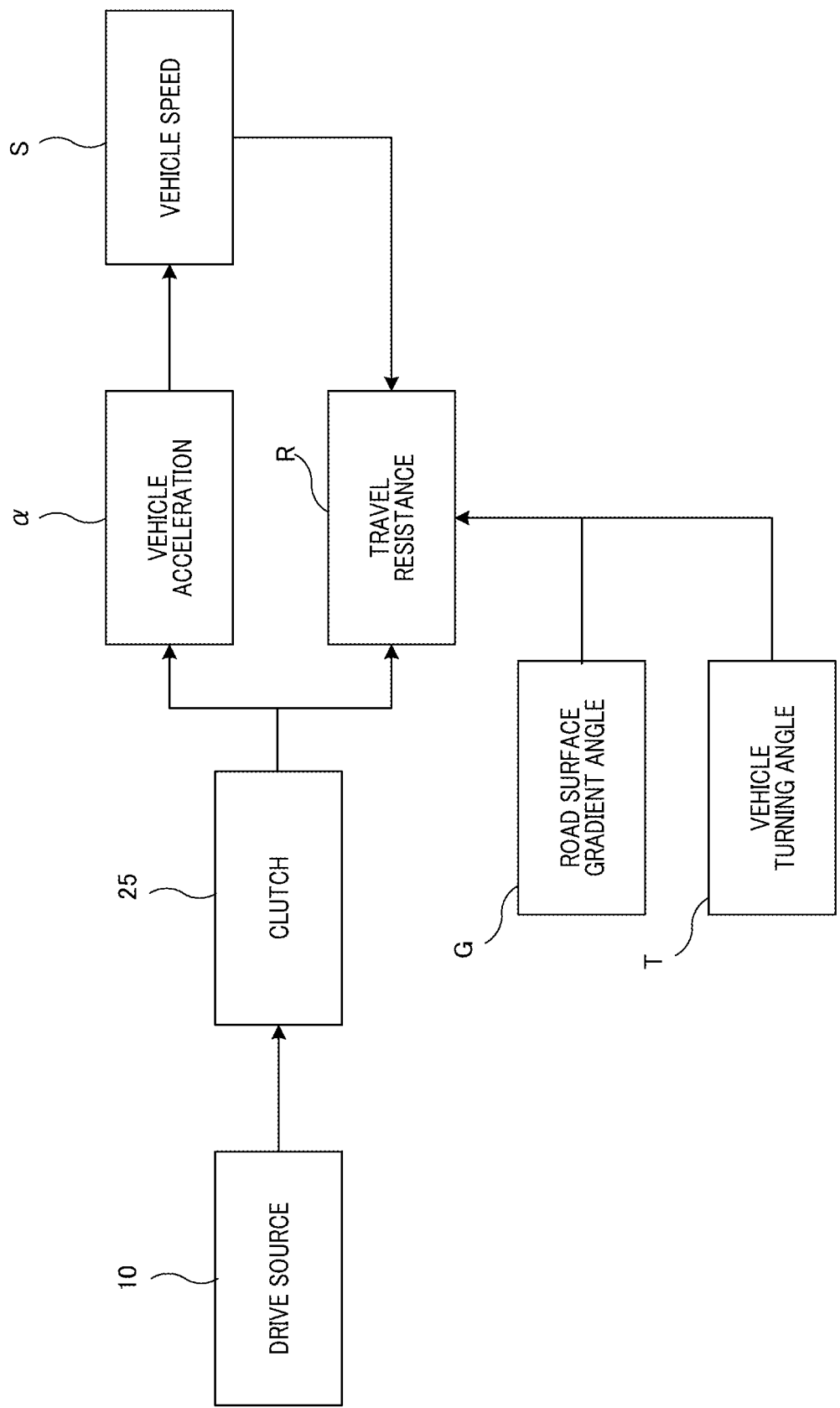
FIG. 3 is a diagram illustrating a power flow in the mobile body.

FIG. 3 is a diagram illustrating a power flow in the mobile body 1. The power output from the drive source 10 is transmitted to the rear wheels 4 via the clutch 25 and the stepped transmission 20. At this time, the power is divided into a portion consumed by a travel resistance R determined by the travel situation of the vehicle and a portion used for the travel itself. The travel resistance R is determined by a rolling resistance, an air resistance, a gradient resistance, an acceleration resistance, and the like.

The power used for traveling determines the vehicle acceleration a, and the vehicle acceleration a determines the vehicle speed S. The vehicle acceleration a and the vehicle speed S affect the travel resistance R. At the same time, a situation where the mobile body 1 is placed, that is, the road surface gradient angle G and the vehicle turning angle T also affect the travel resistance R.

Figure 4:
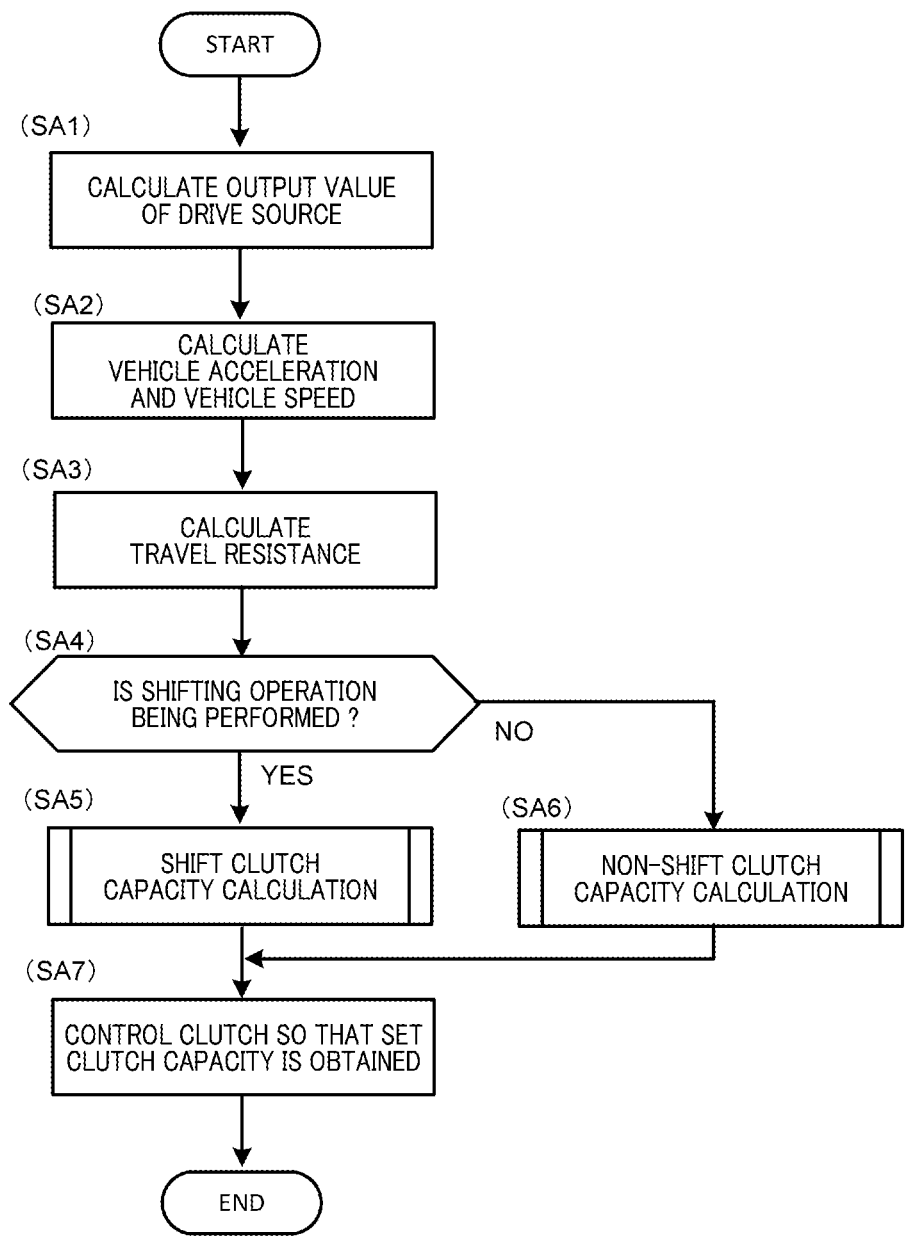
FIG. 4 is a flowchart of the mobile body control according to the present embodiment.

FIG. 4 is a flowchart of the mobile body control according to the present embodiment. First, in the control device 5, the detected information acquisition means 23 acquires the output of the drive source 10 detected by the output detection means 50, and the calculation means 26 calculates the output value (step SA1). Specifically, the output value is calculated based on the rotation speed of the drive source and the magnitude of the torque of the drive source. Next, the calculation means 26 calculates the vehicle acceleration a and the vehicle speed S of the mobile body 1 based on the information acquired from the acceleration detection means 40 (step SA2). The travel resistance calculation means 24 calculates the travel resistance based on the vehicle acceleration a and the vehicle speed S (step SA3). Next, the shift state determination means 27 determines whether or not the shifting operation is being performed from the shift state information acquired from the shift state detection means 60 via the detected information acquisition means 23 (step SA4). When it is determined that the shift operation is being performed (step SA4: YES), shift clutch capacity calculation is performed (step SA5). Then, the control device 5 controls the clutch 25 so that the clutch capacity obtained by the calculation is obtained (step SA7).

When it is determined that the shift operation is not being performed (step SA4: NO), non-shift clutch capacity calculation is performed (step SA6). Then, the control device 5 controls the clutch 25 so that the clutch capacity obtained by the calculation is obtained (step SA7).

Figure 5:
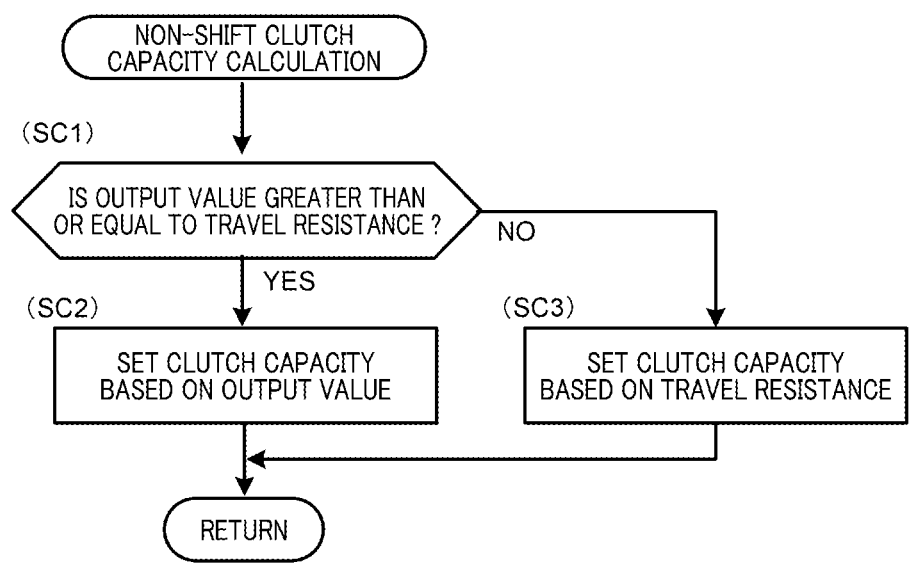
FIG. 5 is a flowchart of clutch capacity calculation at the time of non-shifting.

FIG. 5 is a flowchart of clutch capacity calculation at the time of non-shifting. First, the comparison means 29 compares the output value with the magnitude of the travel resistance R, and determines whether or not the output value is greater than or equal to the travel resistance R (step SC1). When it is determined that the output value is greater than or equal to the travel resistance R (step SC1: YES), a clutch capacity setting means 31 sets the clutch capacity based on the output value (step SC2).

When it is determined that the output value is less than the travel resistance R (step SC1: NO), the clutch capacity setting means 31 sets the clutch capacity based on the magnitude of the travel resistance R (step SC3).

Figure 6:
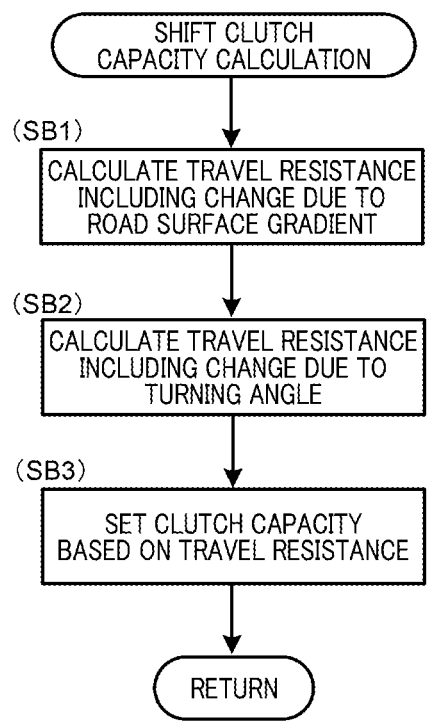
FIG. 6 is a flowchart of clutch capacity calculation at the time of shifting.

FIG. 6 is a flowchart of clutch capacity calculation at the time of shifting. The control device 5 acquires the information of the road surface gradient angle detected by the road surface gradient angle detection means 80 via the detected information acquisition means 23, and the travel resistance calculation means 24 calculates the travel resistance including the change due to the road surface gradient (step SB1). The control device 5 acquires information of the turning angle detected by the turning angle detection means 30 via the detected information acquisition means 23, and the travel resistance calculation means 24 calculates the travel resistance including the change due to the turning angle (step SB2). Next, the clutch capacity setting means 31 sets the clutch capacity based on the calculated travel resistance (step SB3).

Figure 7:
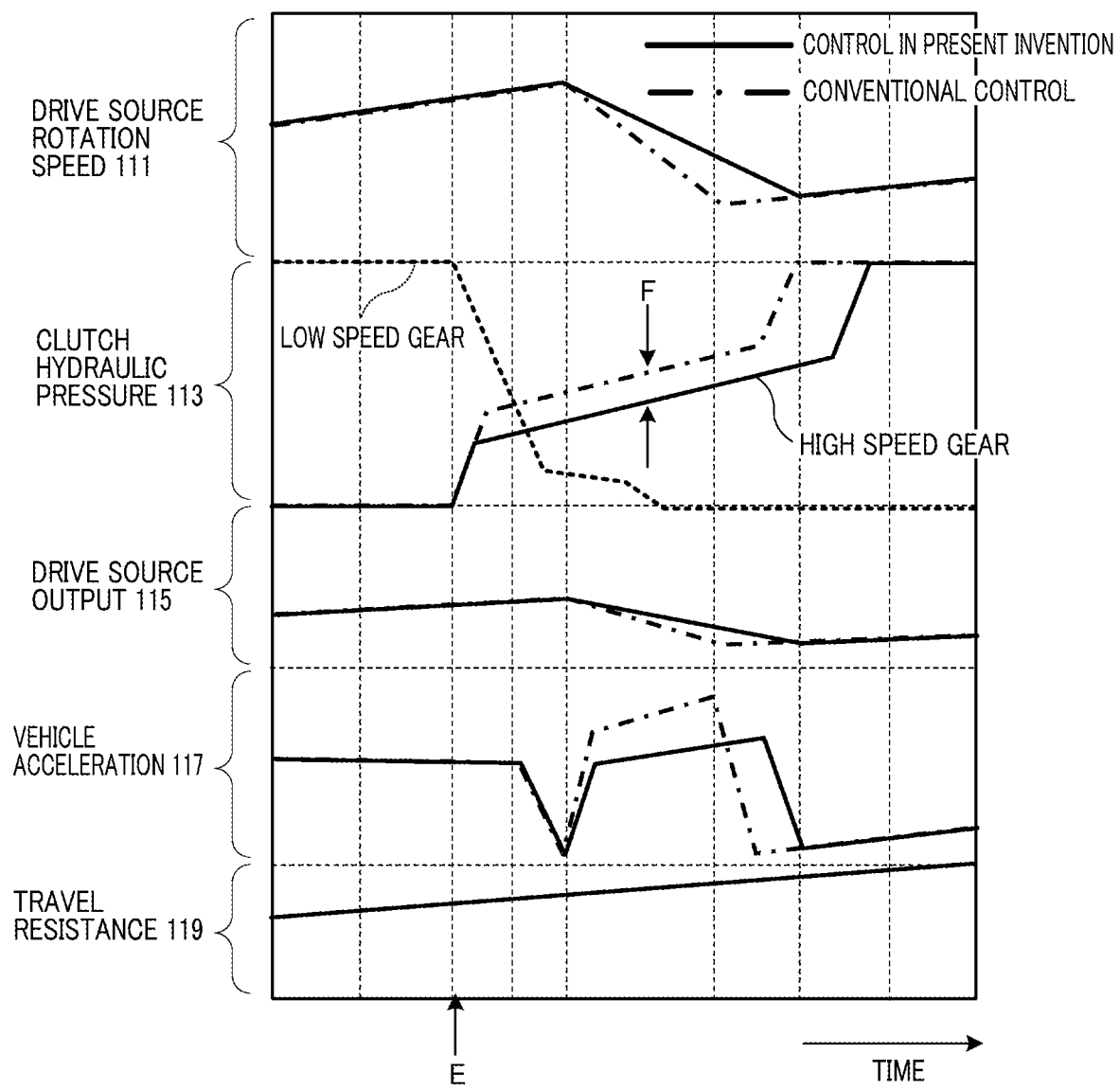
FIG. 7 is a timing chart showing that a shift shock on a climbing road is reduced by clutch capacity control according to the present invention.

FIG. 7 is a timing chart showing that a shift shock on a climbing road is reduced by clutch capacity control included in the mobile body control according to the present embodiment. Here, a case where a shift-up operation is performed in a situation where the mobile body 1 is climbing the climbing road will be described. A chain line indicates a result of the conventional clutch capacity control, and a solid line indicates a result of the clutch capacity control according to the present embodiment.

First, the occupant performs a shift-up operation at a timing E (see a clutch hydraulic pressure 113). Then, the low speed gear is changed to the high speed gear. At this time, the clutch capacity of the high speed gear is set to be lower than the conventional clutch capacity and controlled. Then, since the torque transmission rate decreases in the clutch 25, the change in the vehicle acceleration becomes smaller than that in the case of performing the conventional control, and the change in the acceleration accompanying the shift becomes smaller. In other words, the shift shock is reduced.

Figure 8:
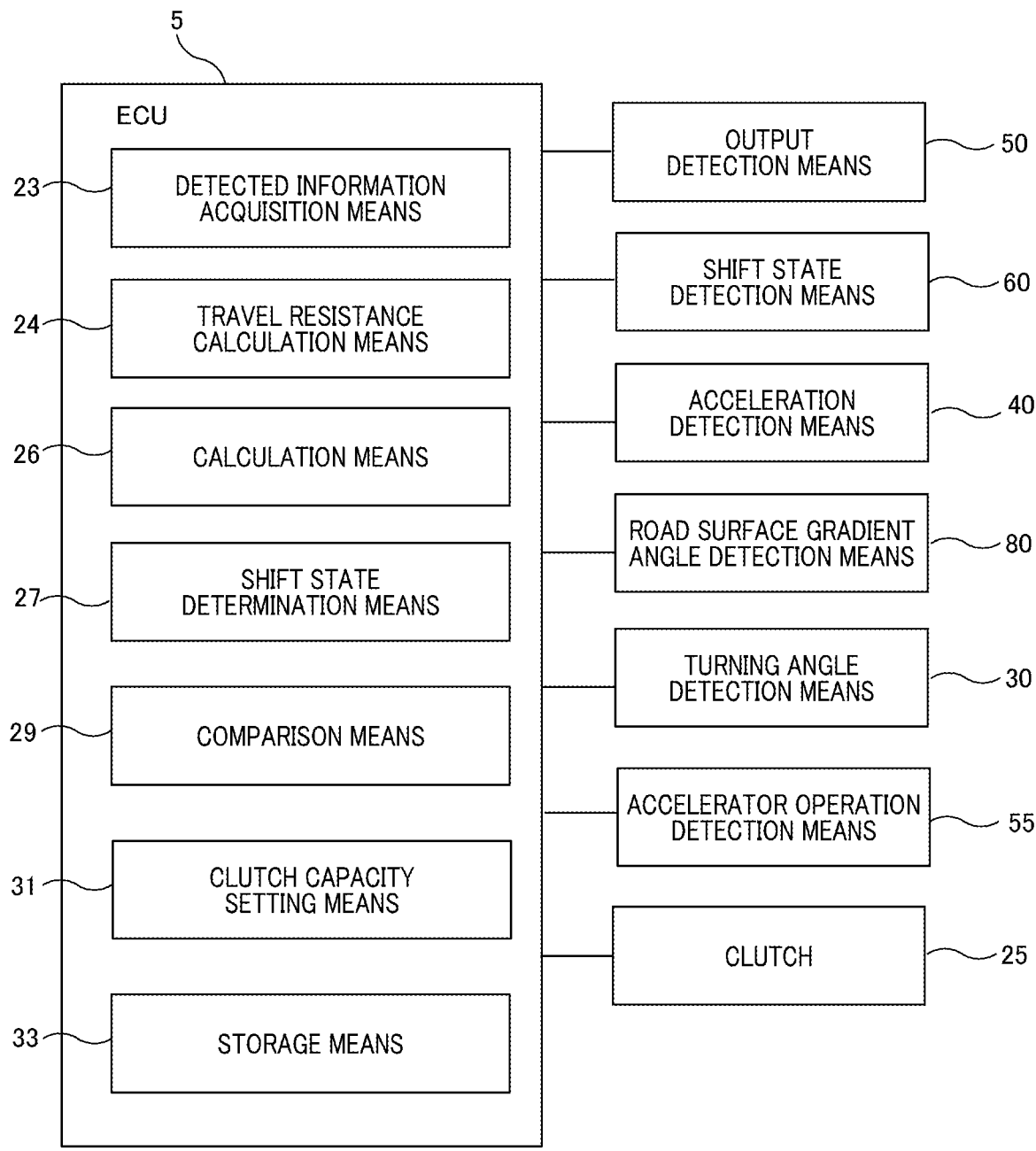
FIG. 8 is a diagram illustrating a configuration for implementing mobile body control according to a modified example.

FIG. 8 is a diagram illustrating a configuration for implementing mobile body control according to a modified example. An accelerator operation detection means 55 is added to FIG. 2 illustrating a configuration for implementing the above embodiment. Other configurations are similar to those in FIG. 2, and thus detailed description thereof is omitted.

The accelerator operation detection means 55 detects an accelerator operation amount by the occupant. The detected accelerator operation amount is acquired by the control device 5 via the detected information acquisition means 23. The clutch capacity setting means 31 sets the clutch capacity based on the accelerator operation amount.

Figure 9:
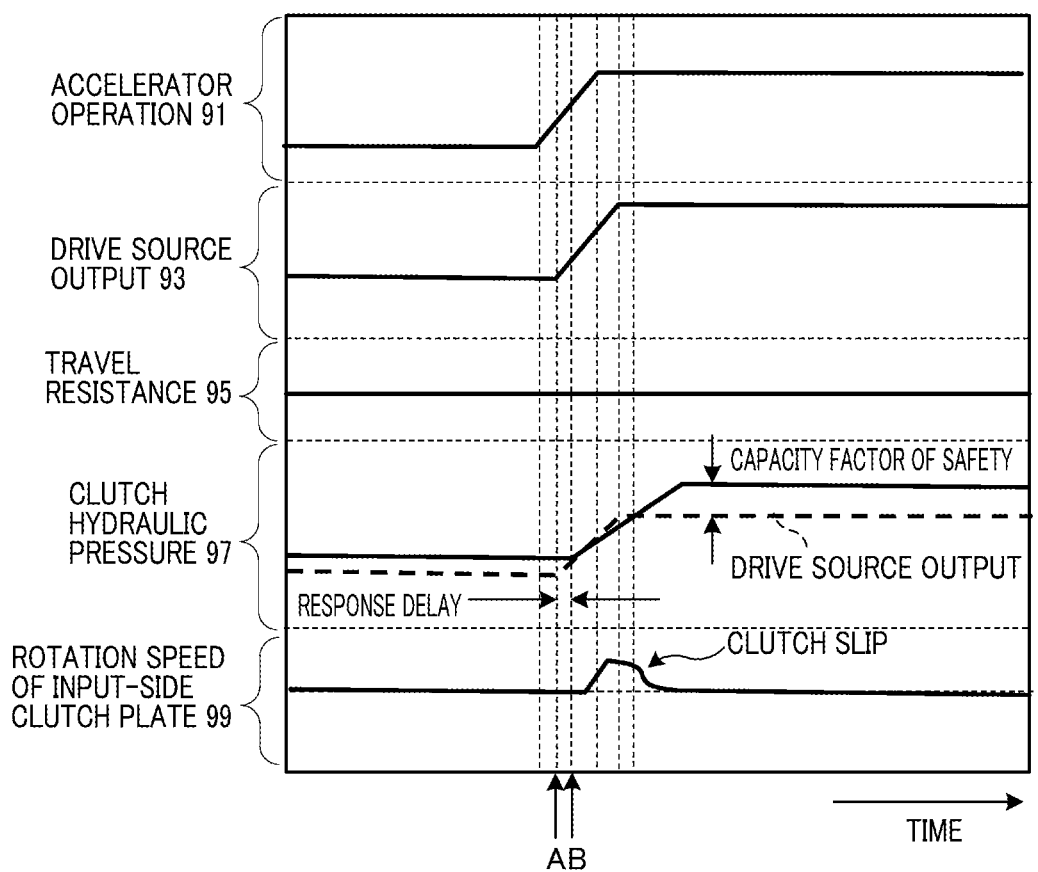
FIG. 9 is a timing chart showing that a clutch slip occurs in the case of conventional clutch capacity control on a flat road.

In order to clarify the operation and effect of the mobile body control of the modified example, first, an example in which a clutch slip occurs when control is performed by the conventional clutch capacity control is shown in FIG. 9. It is assumed that the magnitude of the travel resistance is constant, that is, the mobile body 1 travels on a flat road. An occupant of the mobile body 1 performs an accelerator operation 91. After the accelerator operation amount increases, there is a time lag, and a drive source output 93 increases at a timing A. Here, if a response delay occurs in which a timing B of the increase in the clutch hydraulic pressure is delayed from the timing A, an output equal to or larger than the capacity factor of safety originally set for maintaining torque transmission is transmitted from the drive source to the clutch, and thus, a clutch slip may occur. As a result, the rotation speed of the input-side clutch plate temporarily increases (see a rotation speed 99 of the input-side clutch plate). The clutch slip is not preferable because it leads to wear of the clutch or the like.

Figure 10:
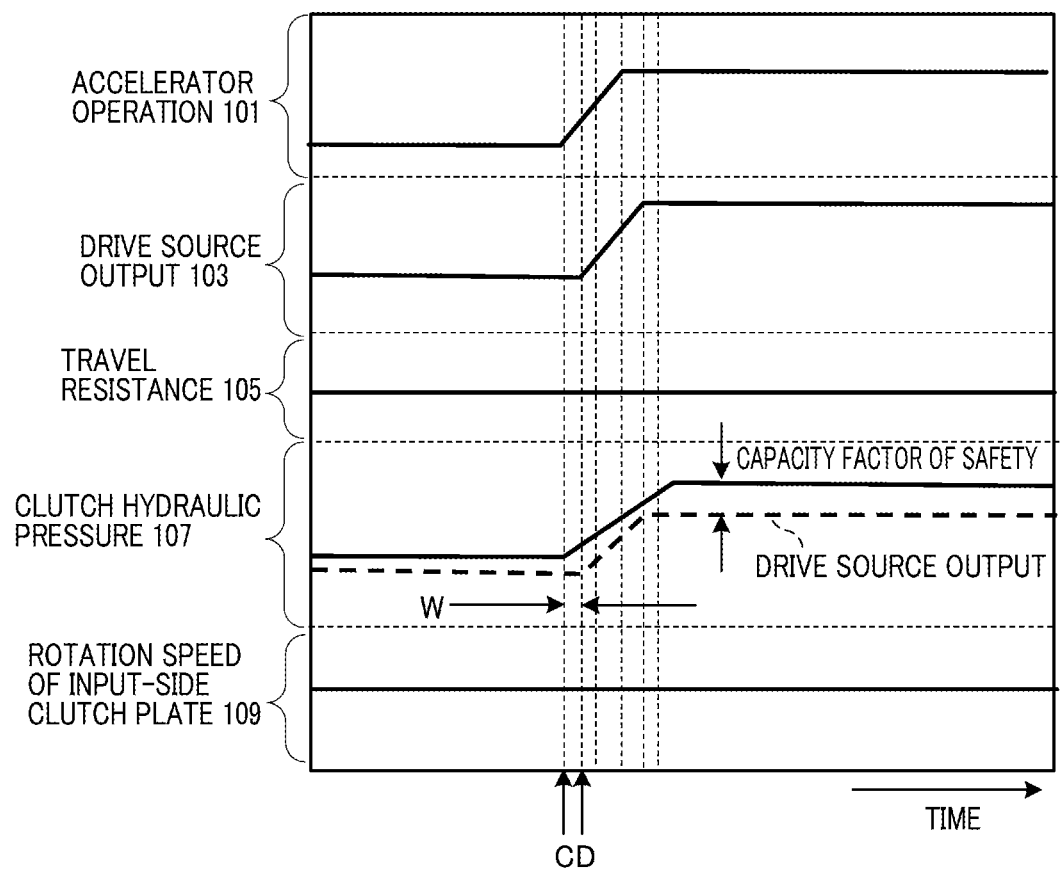
FIG. 10 is a timing chart showing that no clutch slip occurs by clutch capacity control according to the modified example.

FIG. 10 is a diagram showing an example of clutch capacity control included in the mobile body control according to the present modified example. An occupant of the mobile body 1 performs an accelerator operation 101. The accelerator operation detection means 55 detects an increase in the accelerator operation amount, and the control device 5 acquires a timing C at which the accelerator operation is performed. Then, the clutch capacity setting means 31 performs setting to increase the clutch capacity substantially at the same time as the timing C, in other words, in a feedforward manner from the accelerator operation state, and increases the capacity factor of safety. Therefore, the output of the drive source 10 does not exceed the clutch capacity, and it is possible to avoid an occurrence of an unexpected clutch slip (see a clutch hydraulic pressure 107).

[Configurations Supported by Above Embodiment]

The above embodiment supports the following configurations.

(Configuration 1) A mobile body including: a stepped transmission; a clutch; a control device; a drive source; an output detection means that acquires an output of the drive source; and an acceleration detection means that acquires acceleration; in which the control device includes: a travel resistance calculation means that calculates a travel resistance based on the acceleration; and a clutch capacity setting means that performs clutch capacity setting based on the output and the travel resistance.

According to such a configuration, since the clutch capacity is set based on the actual traveling state of the vehicle, the clutch capacity is not unnecessarily set high, and the fuel consumption is improved.

(Configuration 2) The mobile body according to Configuration 1, in which the control device includes: a shift state determination means that determines whether or not the stepped transmission is performing a shifting operation; and a comparison means that compares the output with the travel resistance when it is determined that the stepped transmission is not shifting, and in which the clutch capacity setting means sets a clutch capacity based on a value of either of the output or the travel resistance determined to be larger by the comparison means.

With such a configuration, a necessary clutch capacity can be accurately set. When the travel resistance exceeds the output, the clutch capacity is set in advance based on the travel resistance. Therefore, even when a driver performs an acceleration operation due to a decrease in vehicle speed caused by an increase in the travel resistance, the clutch capacity control can prevent the occurrence of the clutch slip due to a response delay, and drivability is improved.

(Configuration 3) The mobile body according to Configuration 1 or 2, further including a road surface gradient angle detection means that detects a road surface gradient angle, in which the travel resistance calculation means calculates the travel resistance based on the road surface gradient angle.

According to such a configuration, since the travel resistance can be grasped based on the information of the road surface gradient angle having a large influence on the travel resistance change, it is possible to accurately grasp the change in the travel resistance, and as a result, an excellent effect that an appropriate clutch capacity can be set is obtained.

(Configuration 4) The mobile body according to any one of Configurations 1 to 3, further including a turning angle detection means that detects a turning angle of the mobile body, in which the travel resistance calculation means calculates the travel resistance based on the turning angle.

The travel resistance increases due to the turning of the vehicle. According to such a configuration, since the travel resistance can be grasped in consideration of the influence of the turning angle, it is possible to accurately grasp the change in the travel resistance, and as a result, an excellent effect that an appropriate clutch capacity can be set is obtained.

(Configuration 5) A mobile body control method including: an output acquisition step of acquiring an output of a drive source; an acceleration acquisition step of acquiring acceleration; a travel resistance calculation step of calculating a travel resistance based on the acceleration; and a clutch capacity setting step of setting a clutch capacity based on the output and the travel resistance.

According to such a configuration, since the clutch capacity is set based on the actual traveling state of the vehicle, the clutch capacity is not unnecessarily set high, and the fuel consumption is improved.

(Configuration 6) The mobile body control method according to Configuration 5, further including: a shift state determination step of determining whether or not a stepped transmission is performing a shifting operation; and a comparison step of comparing the output with the travel resistance when it is determined that the stepped transmission is not shifting, in which the clutch capacity setting step sets the clutch capacity based on a value of either of the output or the travel resistance determined to be larger in the comparison step.

With such a configuration, a necessary clutch capacity can be accurately set. When the travel resistance exceeds the output, the clutch capacity is set in advance based on the travel resistance. Therefore, even when a driver performs an acceleration operation due to a decrease in vehicle speed caused by an increase in the travel resistance, the clutch capacity control can prevent the occurrence of the clutch slip due to a response delay, and drivability is improved.

(Configuration 7) The mobile body control method according to Configuration 5 or 6, further including a road surface gradient angle detection step of detecting a road surface gradient angle, in which the travel resistance calculation step calculates the travel resistance based on the road surface gradient angle.

According to such a configuration, since the travel resistance can be grasped based on the information of the road surface gradient angle having a large influence on the travel resistance change, it is possible to accurately grasp the change in the travel resistance, and as a result, an excellent effect that an appropriate clutch capacity can be set is obtained.

(Configuration 8) The mobile body control method according to any one of Configurations 5 to 7, further including a turning angle detection step of detecting a turning angle of the mobile body, in which the travel resistance calculation step calculates the travel resistance based on the turning angle.

The travel resistance increases due to the turning of the vehicle. According to such a configuration, since the travel resistance can be grasped in consideration of the influence of the turning angle, it is possible to accurately grasp the change in the travel resistance, and as a result, an excellent effect that an appropriate clutch capacity can be set is obtained.

The above embodiment illustrates one aspect to which the present invention is applied, and the present invention is not limited to the above embodiment.

For example, the step units of the operation illustrated in FIGS. 4, 5, and 8 are divided according to main processing contents in order to facilitate understanding of the mobile body and the mobile body control method, and the present invention is not limited by the way of division of the processing unit or name. The processing may be divided into more step units according to the processing contents. In addition, the processing may be divided such that one step unit includes more processes. In addition, the order of the steps may be appropriately changed within a range not hindering the gist of the present invention.

REFERENCE SIGNS LIST

5 control device
10 drive source
20 stepped transmission
24 travel resistance calculation means
25 clutch
27 shift state determination means
29 comparison means
30 turning angle detection means
31 clutch capacity setting means
40 acceleration detection means
50 output detection means
80 road surface gradient angle detection means

What is claimed is:
1. A mobile body comprising:
a stepped transmission;
a clutch;
a control device including a processor;
a drive source that is an engine or a motor;
an output detection sensor that acquires an output of the drive source; and
an acceleration detection sensor that acquires acceleration;
wherein the processor of the control device includes:
 a travel resistance calculation means that calculates a travel resistance based on the acceleration;
 a clutch capacity setting means that performs clutch capacity setting based on the output and the travel resistance;
 a shift state determination means that determines whether or not the stepped transmission is performing a shifting operation; and
 a comparison means that compares the output with the travel resistance when it is determined that the stepped transmission is not shifting, wherein the clutch capacity setting means sets a clutch capacity based on a value of either of the output or the travel resistance determined to be larger by the comparison means.

2. The mobile body according to claim 1, further comprising
a road surface gradient angle detection sensor that detects a road surface gradient angle,
wherein the travel resistance calculation means calculates the travel resistance based on the road surface gradient angle.

3. The mobile body according to claim 1, further comprising
a turning angle detection means that detects a turning angle of the mobile body,
wherein the travel resistance calculation means calculates the travel resistance based on the turning angle.

4. A mobile body control method comprising:
an output acquisition step of acquiring an output of a drive source;
an acceleration acquisition step of acquiring acceleration;
a travel resistance calculation step of calculating a travel resistance based on the acceleration;
a clutch capacity setting step of setting a clutch capacity based on the output and the travel resistance;
a shift state determination step of determining whether or not a stepped transmission is performing a shifting operation; and
a comparison step of comparing the output with the travel resistance when it is determined that the stepped transmission is not shifting,
wherein the clutch capacity setting step sets the clutch capacity based on a value of either of the output or the travel resistance determined to be larger in the comparison step.

5. The mobile body control method according to claim 4, further comprising
a road surface gradient angle detection step of detecting a road surface gradient angle,
wherein the travel resistance calculation step calculates the travel resistance based on the road surface gradient angle.

6. The mobile body control method according to claim 4, further comprising
a turning angle detection step of detecting a turning angle of the mobile body,
wherein the travel resistance calculation step calculates the travel resistance based on the turning angle.

* * * * *